April 27, 1965     H. WALTER     3,180,174
SEQUENTIAL GEAR SHIFT CONTROL MECHANISM
Filed Sept. 10, 1962     6 Sheets-Sheet 1
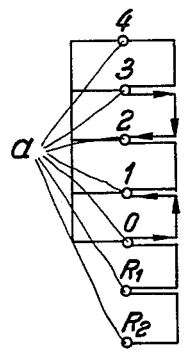
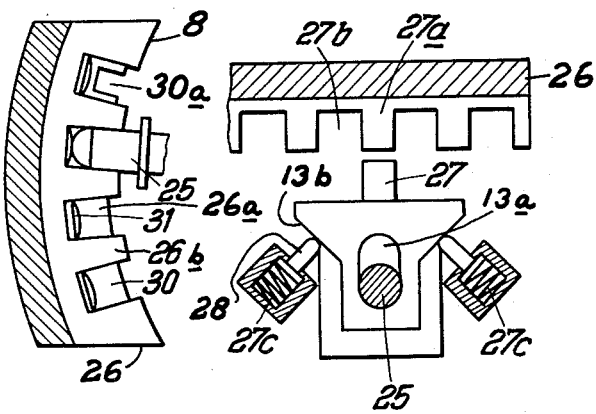
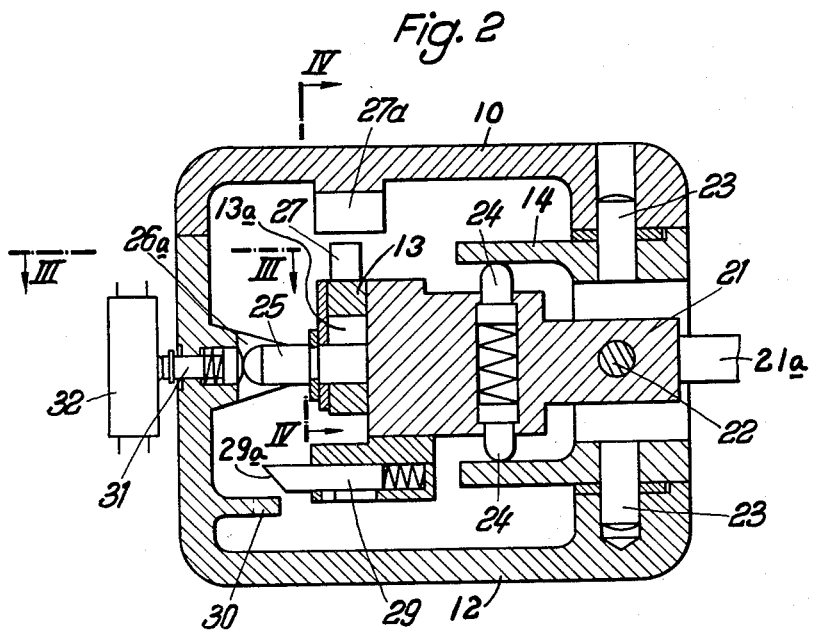
Inventor:
HEINZ WALTER
by Albert W Zalkind
ATTORNEY April 27, 1965  H. WALTER  3,180,174
SEQUENTIAL GEAR SHIFT CONTROL MECHANISM
Filed Sept. 10, 1962  6 Sheets-Sheet 3
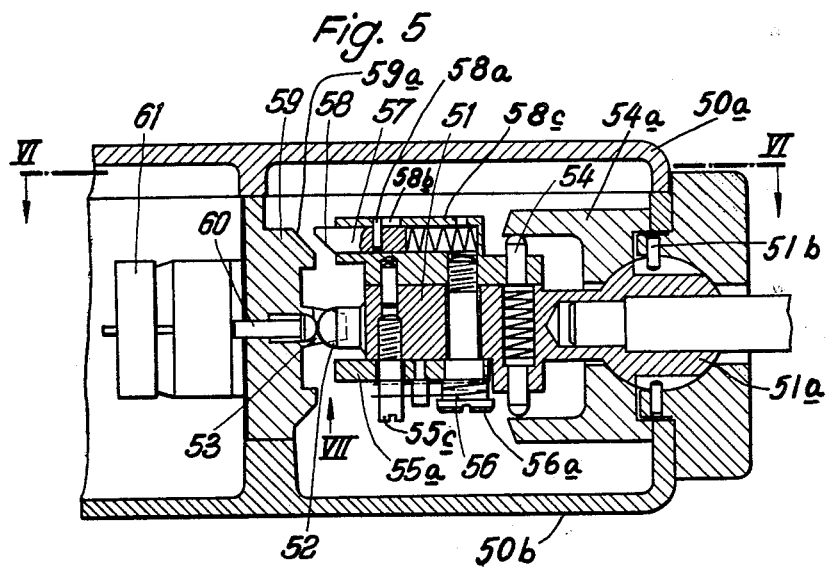
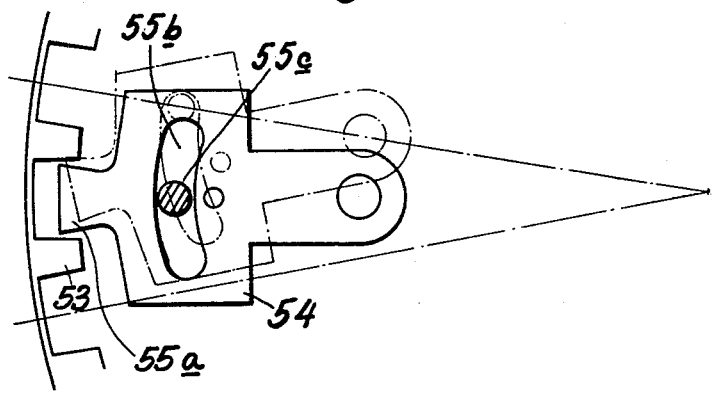

United States Patent Office 3,180,174
Patented Apr. 27, 1965

3,180,174
SEQUENTIAL GEAR SHIFT CONTROL
MECHANISM
Heinz Walter, Friedrichshafen, Germany, assignor to
Zahnradfabrik Friedrichshafen Aktiengesellschaft,
Friedrichshafen, Germany
Filed Sept. 10, 1962, Ser. No. 222,346
Claims priority, application Germany, Sept. 14, 1961,
Z 8,965
15 Claims. (Cl. 74—475)

This invention relates to gear shift transmissions and more particularly to a control mechanism for operating the switches of a solenoid controlled transmission, or other electrically controlled transmission.

The particular purpose of the invention is to provide a gear shift control for use in vehicles that are driven over rough and uneven terrain, where jolts and severe shocks to the vehicle might result in advertent shifting from any particular speed in which the vehicle is traveling. Such inadvertent shifting can, of course, be injurious and damaging, or even dangerous.

Other objects and features of the invention will be apparent in the description which follows:

Briefly, the invention provides a mechanism wherein shifting can be effected only in a step-by-step manner; that is, from any particular speed, up or down one speed, to the next speed. The mechanism provides structure where such shifting must be made by deliberate manual following of three different motions by a gear shift lever, under control of the vehicle driver. The mechansim likewise provides for immediate shifting from any speed into neutral position, by a single motion wherein shifting from neutral back to torque transmission must take place through a succession of speeds starting with the lowest speed.

The actual structure, as shown in three modifications disclosed herein, contemplates the use of a gear shift lever pivotally mounted so as to be rockable in a vertical and in a horizontal plane. Rocking in one plane, for example, the horizontal plane, positions a finger carried by the lever for pressing a push button to control a particular speed. However, by providing detent means, e.g., a row of speed selection notches wherein the notches are associated with respective push buttons, the finger is detained or trapped and unable to move in a horizontal plane once it has been placed in a selected speed notch. In order to release the finger for another speed by way of moving into another notch, it is necessary to first rock the shift lever in a vertical plane. Such motion releases the finger from the detent but effects a motion limiting restraint so that the shift lever can be moved in a horizontal plane to another notch, but only to the arcuate extent of the next adjoining notch, whether that notch be for a lower or higher speed than the notch from which the finger was removed. Thence, opposite directional movement in a vertical plane effects movement of the finger into such selected adjoining notch. The structure likewise provides for motion of the shift lever in a vertical plane, for the purpose of selecting a neutral position notch on a horizontal plane. This can be accomplished from any speed in which transmission happens to be set, and once accomplished, the finger is locked in neutral position and the three separate motions of the shift lever, as described above, must be proceeded through, in order to shift to a speed for torque transmission to the vehicle wheels, starting at the lowest speed, or going into reverse speed from neutral, if desired.

A detailed description of the invention now follows, in conjunction with the appended drawing, in which:

FIG. 1 is a diagram showing symbolically the particular motional directions which must be followed in shifting;

FIG. 2 is a cross sectional elevation of one form of the invention;

FIG. 3 is a view through III—III of FIG. 2;

FIG. 4 is a view through IV—IV of FIG. 2;

FIG. 5 is a cross sectional elevation of another form of the invention;

FIG. 7 is a fragmentary plan view looking in the direction of the arrow VII, as seen on FIG. 5;

Figure 4A:
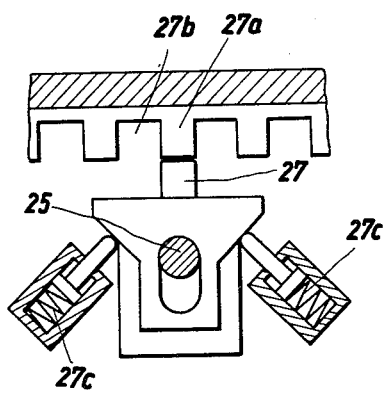
FIGS. 4a, 4b and 4c show the elements of FIG. 4 in various stages of actuation.

In the form of the invention shown in FIGS. 1–4, the significant features comprise a casing having sections 10 and 12 in which a gear shift lever 21 is mounted so as to be rockable in a vertical plane on the pin 22 and in a horizontal plane on the pin 23. The lever is maintained in central position with respect to the horizontal plane by spring pressed pins 24 acting against the inner sides of bracket 14 carried by the casing. Secured to the end of the lever is a switch actuating finger 25, shown as abutting a push button 31 which effects actuation of a switch 32, such switch being for controlling a transmission for a particular speed.

The casing section 12 has a shoulder 26 formed thereon extending inwardly; which shoulder is provided with a row or plurality of notches 26a, the series of notches being separated by teeth 26b and constituting a detent or locking means, each such notch corresponding by predetermined position in the row with a respective speed to be controlled by a respective switch 32 (not shown). Thus, as indicated in the diagram of FIG. 1, for the particular control mechanism, there are four forward speeds, designated as "1," "2," "3," "4," an idling, i.e., neutral position, designated as "0" and two reverse speeds designated as "R1" and "R2" letter a in FIG. 1 indicating the symbolic positions of the finger 25 for each of the designated speeds as determined by the notches.

Figure 4B:
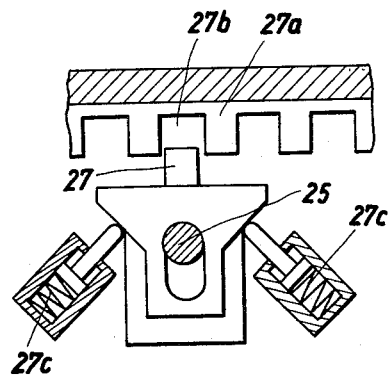
Figure 4C:
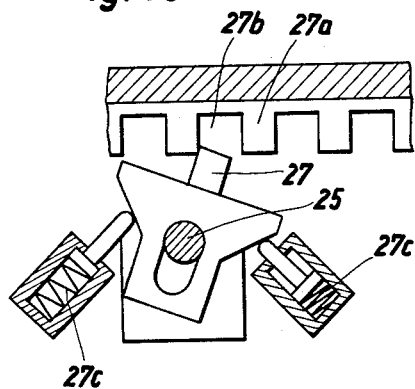

A means for restraining movement of finger 25 against shifting more than one speed at a time, either up or down speed, comprises a plate 13 having a slot 13a through which pin 25 protrudes and which plate carries a lock pin 27 on its upper edge, which pin is engageable in any one of a row of notches such as 27b between teeth 27a, as part of casing section 10 shown in FIG. 4. The lever 21 carries pins 28, having biasing springs 27c, which pins bear against the sloping shoulders 13b of plate 13. Accordingly, it will be understood that if lever 21 is rocked clockwise (as seen in FIG. 2), the pin 27 will engage the tooth 27a thereabove and continued movement of the lever will effect compression of the springs 27c, pressing pin 27 against tooth 27a resiliently, plate 13 riding via slot 13a on finger 25 (FIG. 4a). If now lever 21 be rocked on a horizontal plane (FIG. 3), the pin 27 will snap into either of the recesses or notches 27b at the sides of tooth 27a (FIG. 4b). Such movement of finger 25 in a horizontal plane is thus limited to a change of position of finger 25 for a single speed only, either up or down speed from the original speed by virtue of pin 27 being locked in a notch 27b and preventing a horizontal rocking of lever 21 by an amount greater than the distance between two teeth 27a. By moving the lever 21 on the last part of said distance the plate 13 with the pin 27 runs against the next tooth 27a. In consequence of that the plate 13 turns round the finger 25 (see FIG. 4c). By swinging the lever 21 and the finger 25 again in the horizontal plane the pin 27 comes out of the notch 27b and the plate 13 with the pin 27 returns in the position which FIG. 4 shows. Lever 21 can now be rocked counter-clockwise (FIG. 2) on pin 22 so that the finger 25 engages a push button switch 31 disposed at the selected detent notch 26a for effecting actuation of the respective switch 32, to effect the respective speed associated therewith.

Accordingly, it will be apparent that in order to shift from one speed to the next, only a single speed at a time can be shifted and this must be performed by movement in three directions, as noted in FIG. 1, wherein the open headed arrows show three directions of motion for a down shift from third to second speed. As viewed on FIGS. 2 and 3, this would involve upward movement of finger 25 in a vertical plane, and finally vertical movement downwardly again in a vertical plane, but in a reverse direction to the first movement.

In order to shift into idle or neutral position, the casing section 12 carries a shelf or shoulder 30 having a single notch 30a which corresponds in position to neutral, i.e., idling speed of the associated transmission. The lever 21 carries a spring biased trip pin 29 having a cam end 29a which can engage the edge of the shoulder 30 (FIG. 2) when lever 21 is rocked counter-clockwise in a vertical plane. By camming action that pin 29 snaps to a locking position beneath the shoulder. Once pin 29 is below shoulder 30, the transmission can be put only in neutral and this is effected by swinging lever 21 horizontally until finger 25 aligns with notch 30a (FIG. 3) at which time lever 21 can be swung in a vertical plane to bring finger 25 up through notch 30a and into notch 26 corresponding to neutral. As seen on FIG. 1, it will be apparent that the adjoining speeds are either first speed forward, or first speed reverse, and no other speed can be selected because of the restraining action of pin 27 and notches 27b. Thus, on FIG. 1, the same three motion movements of the shift lever 21 are required, as indicated by full headed arrows in shifting from idling position to first speed.

Shift lever 21 may be manually operated by a handle extension, such as the rod 21a, indicated in FIG. 2.

Figure 6:
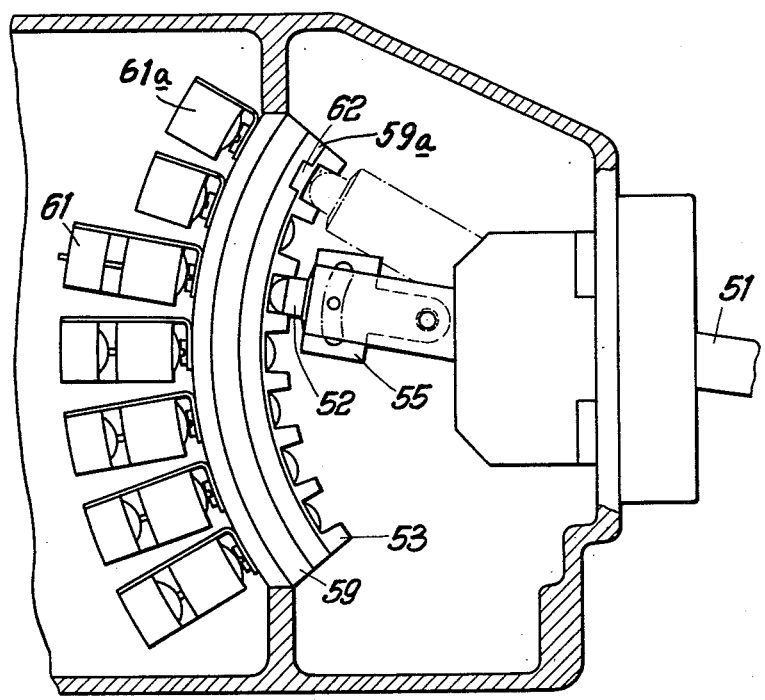
FIG. 6 is a view through VI—VI of FIG. 5.

Referring now to another form of the invention, as shown in FIGS. 5, 6 and 7, a casing having sections 50a and 50b carries the shift control lever 51 for movement in vertical and horizontal planes by means of a ball joint 51a and trunnnion pins such as 51b. Spring biased pins such as 54, acting against arms of the bracket 54a maintain lever 51 in horizontal position, wherein switch actuating finger 52 secured to lever 51 remains located in a notch of the row of notches provided in shoulder 53 (see FIG. 6), which shoulder is carried to a plate 59 secured suitably between the casing sections, and which plate carries push buttons 60 in respective notches and actuatable by finger 52 for operating respective switches 61.

As a horizontal motion limiting means the lever 51 carries a pivotal plate 55 having a motion limiting finger 55a of dimensions to fit into any of the row of notches of the shelf 53 (see FIG. 7). The plate is pivoted on a bolt 56a (FIG. 5) and has a slot 55b (FIG. 7) through which a bolt 55c carried by lever 51 protrudes. A torsion spring 56 is carried by bolt 56a and maintains plate 55 in the central position shown in solid lines in FIG. 7, so that bolt 55c is centered with respect to slot 55b. It will be understood that the finger 55a is disposed vertically below shelf 53 so that if lever 51 will be rocked counter-clockwise (FIG. 5), the finger 55a will enter into the same notch of shelf 53 as finger 52 is leaving. However, it will be appreciated that finger 52 cannot fully leave the notch until finger 55a is inside that notch. The subsequent movement or rocking in a horizontal plane of lever 51 will cause the finger 55a to engage one side or the other of the notch, depending on the direction of movement of lever 51. Such engagement will rock finger 55a (FIG. 7) and limit the horizontal swinging of lever 51 when either end of slot 55b engages bolt 55c. The degree of angular motion thus effected, in either direction for the lever, is the degree needed to shift the finger 52 into vertical registration with the next succeeding notch, whereupon reversed vertical rocking of the lever 51 will effect finger 52 engagement. In other words, the action of the finger 55a, due to its dimensions, permits fingers 52 to be fully moved upwardly (FIG. 5) out of any notch, but the sides of finger 55a then prevent, by engaging a side tooth of that notch, from rocking more than half the length of slot 55b, which is, of course, dimensioned so that finger 52 is then readily aligned but below the next succeeding speed selection notch. At this time, on counter-clockwise movement of lever 51 (FIG. 5), finger 52 goes into that next succeeding notch, finger 55a meanwhile moving downwardly out of that notch and being again centered with respect to the axis of lever 51 by the action of spring 56.

In order to effect an idling position, the lever 51 carries a spring-pressed trip pin 58 having axial motion restrained by a stop pin 58a acting in a slot 58b, all provided in a member 58c which is carried by lever 51. The pin 58 has a cam end for coaction with a shelf or shoulder 59a of plate 59, so that upon counter-clockwise rocking of lever 51, pin 58 will snap past, by cam action, shelf 59a. At this time finger 52 is below the notch shelf 53, and lever 51 can then be swung in a horizontal plane clockwise, as seen on FIG. 6, to below the idling button position, as indicated in phantom lines. At this time, finger 58 is aligned with a notch 62 in the shelf 59a and the lever 51 can then be swung counter-clockwise in a vertical plane (as will be understood from FIG. 5) to bring finger 52 into engagement with the button for switch 61a for effecting neutral condition of the associated transmission.

Figure 8:
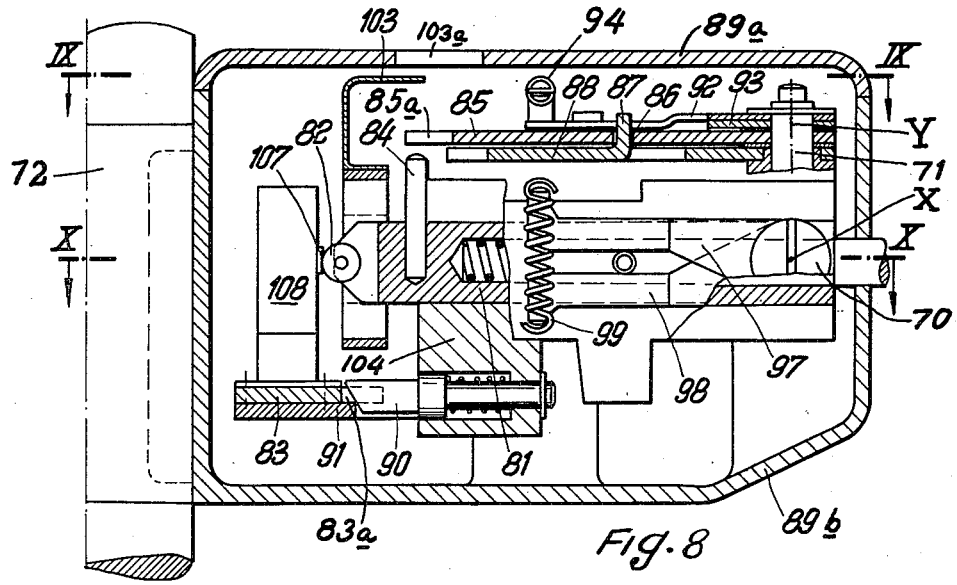
FIG. 8 is an elevation in cross section of a third modification of the invention.
Figure 9:
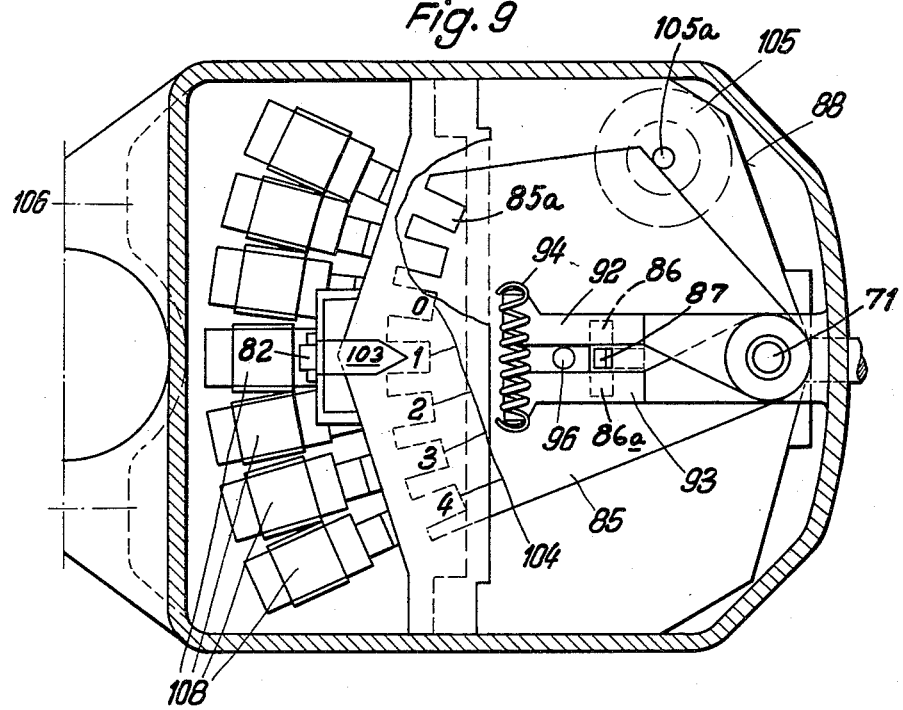
FIG. 9 is a view through IX—IX of FIG. 8.
Figure 10:
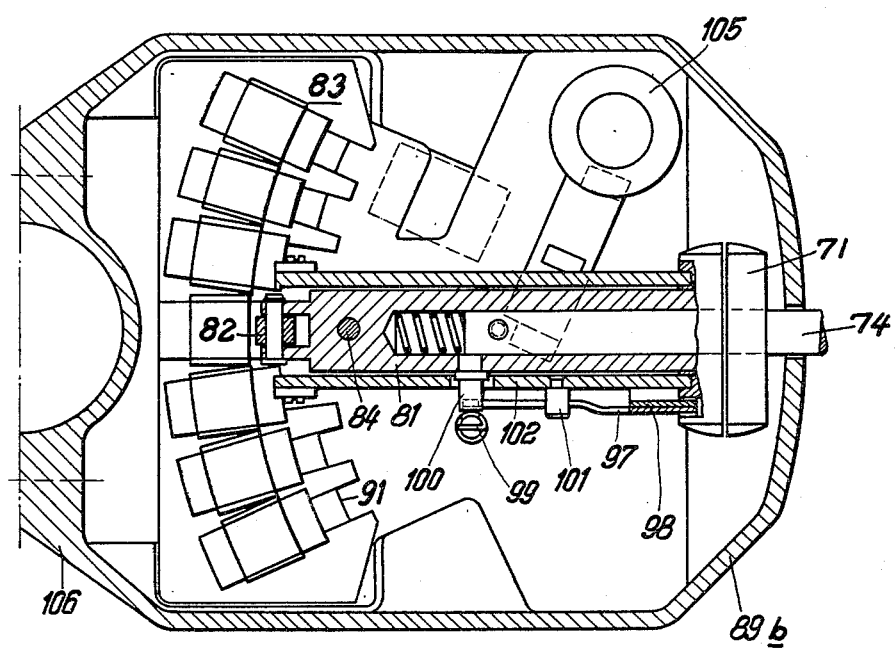
FIG. 10 is a view through X—X of FIG. 8.

In the form of the invention shown in FIGS. 8-10, a casing having sections 89a and 89b has mounted therein a trunnion pin 70 (FIG. 8) and a trunnion pin 71 (FIG. 10) which will be understood to support a shift lever 81 for swinging in vertical and horizontal planes, respectively, on the Y and X axes. The casing may be secured to a steering post 72 by being formed with a semi-cylindrical end channel at 106 which constitutes half of a post clamp. A manually operable shaft, such as 74, may extend from the shift lever 81 conveniently at the side of housing 89, for operation by a driver. In this form of the invention, the switches such as 108 (FIG. 8) are actuated by a roller 82 carried at the end of the shift lever 81. The roller 82 acts on the switches through respective push buttons 107.

As a horizontal motion limit means, lever 81 carries a pin 84 which is engageable in any one of a series of notches 85a at the periphery of a swingable plate 85, which plate may be pivotal around the pivot pin 71 (FIG. 8). The plate 85 is confined to a degree of motion afforded by the ends 86a of a slot 86, in the plate, which ends on an ear 87, bent upwardly from a fixed plate 88 rigidly secured within the casing, and protruding through slot 86. The slot 86 is of such length as to confine motion of lever 81 to a distance sufficient only for roller 82 to move in a horizontal plane (FIG. 9) from one push button to another, in either direction, thus confining the shifting of the transmission to one speed at a time, consecutively, up or down.

As seen on FIG. 8, if lever 81 be rocked around pin 70, in a vertical plane counter-clockwise, the pin 84 engages in a notch 85 respective to the particular speed at which lever 81 is set at that time; thence rocking of lever 81 in a horizontal plane (FIG. 10) causes rocking of plate 85 but only up to the limit in either direction afforded by slot 86, at which limit roller 82 can be moved downwardly (FIG. 8) to engage the push button for the next succeeding speed, either up or down speed, within a notch 83a. Accordingly, it will be seen that the same manual motions are required as in the modifications previously disclosed, for example, as shown in FIG. 1.

In order to maintain the plate 85 horizontally centrally disposed with respect to the lever 81, a pair of arms 92 and 93 (FIG. 9) are pivotally carried on pin 71 and are biased towards each other by a spring 94 and act against the ear 87.

For the purpose of maintaining the lever 81 in vertically centered position, a pair of arms 97 and 98 (FIG. 8) pivoted on pin 70 are provided, spring biased towards each other as by a tension spring 99 and engaging pins 100 and 101 (FIG. 10). Pin 100 is secured to lever 81 which effects centering, while pin 101 is secured to a horizontally swingable lever 102 which forms part of an indicator means. Thus, lever 102 carries a pointer 103 (FIG. 9) visible through casing aperture 103a (FIG. 8) which indicates the speeds corresponding to predetermined notched positions, such as for neutral, through "4" for fourth speed, as printed or otherwise portrayed on a scale 104 (FIG. 9) on the outside of the casing.

For locking roller 82 against any switch and also for neutral control, the lever 81 carries a block 104 (FIG. 8) which carries a spring biased trip pin 90 having a cam end as shown. The cam end is engageable with a shelf on plate 91, carried by the casing, and being provided with a single notch (not shown) but which will be understood to be below the "0" position on scale 104 (FIG. 9). Accordingly, counter-clockwise rocking in a vertical plane (FIG. 8) of lever 82 will cause finger 90 to snap below plate 91, whereupon the lever can be swung in a horizontal plane to align finger 90 with the neutral notch (not shown) in plate 91 to permit upward motion of roller 82 into engagement with the neutral notch.

Below the series of switches a detent means is disposed and comprises a notched plate 83 which is secured above the idling control plate 91, and it will be noted that the trip pin 90 is engageable in the notches 83a of plate 83, all of which are in vertical register with respective switch positions. Accordingly, in this instance, the pin 90 serves as the detent element which maintains roller 82 in engagement with any selected push button 107.

The operation of this form of the invention will be apparent from the description given. Assuming the condition shown in FIG. 8, in order to change speed, the lever 81 is swung counter-clockwise, thus releasing pin 90 from any notch 83a in which it happens to be in at the time, but at the same time causing motion limit pin 84 to go into a notch 85a of plate 85, which has limited pivotal horizontal motion about pin 71 and, accordingly, limits the swinging of lever 81 to the location of the next succeeding push button 107, in either horizontal direction around trunnion pin 71. Having completed such motion, either up or down speed, lever 81 is then rocked in the reverse direction vertically, that is, counter-clockwise, as seen in FIG. 8, to bring the roller 82 into engagement with the selected push button, at which time pin 84 leaves notch 85a, freeing the lever 81 but pin 90 then engages in the respective notch 83a effecting a detent against horizontal rocking of the lever.

In order to lock the control mechanism in any particular speed against shifting to a lower speed, an electro magnet 105 (FIGS. 9 and 10) is provided having a plunger 105a which can be moved into position to block pivotal movement counter-clockwise (FIG. 9) of the plate 85 by abutting the edge of that plate, as seen in FIG. 9. Energization of the electro magnet is in response to a predetermined excess rate of r.p.m. of an associated motor (not shown) which can be effected by a centrifugal switch (not shown). It will be appreciated that unless plate 85 is permitted to rock in its plane in the direction of a downspeed shift, the finger 84 is locked against movement in such direction.

From the foregoing description of the several modifications, it will be apparent that the primary purpose of the invention has been achieved. However, it is understood that although all of the modifications show the row of detent notches as being arcuately arrayed, the invention is not limited to an arcuate array. Obviously, the row of notches could be linear with suitable mount, or the gear shift lever to coact therewith. Likewise, although the row of notches is shown as concave, it could as well be convex. Thus, the notches in convex could be carried by the shift lever with the finger being fixed to the casing.

Further, the directions of movement given as vertical and horizontal are for purposes of example, and it is obvious that any orientation of the mechanism can be used.

Accordingly, I do not seek to be limited to the precise illustration herein given, except as set forth in the appended claims.

I claim:

1. In a mechanism of the class described for selecting the speed of a gear transmission, a shift lever and means for mounting said lever for movement in two angularly related planes and means whereby predetermined positions of said lever with reference to one of said planes is operative to effect a respective speed of said gear transmission, detent means disposed for coaction with said lever at each of said predetermined positions and being operative to hold said lever against movement in said one plane, and permitting release of said lever on movement in the other of said planes, motion limiting means operative on movement of said lever in said other plane for restraining said lever with respect to movement in said one plane to the extent of engagement with said detent means for the next upper or lower speed only.

2. In a mechanism of the class described for selecting the speed of a gear transmission, a shift lever and means for mounting said lever for movement in two angularly related planes and means whereby predetermined positions of said lever with reference to one of said planes is operative to effect a respective speed of said gear transmission, detent means comprising spaced teeth disposed for coaction with said lever at each of said predetermined positions and being operative to hold said lever against movement in said one plane, and permitting release of said lever on movement in the other of said planes, motion limiting means comprising spaced teeth operative on movement of said lever in said other plane for restraining said lever with respect to movement in said one plane to the extent of engagement with said detent means for the next upper or lower speed only.

3. In a mechanism of the class described for selecting the speed of a gear transmission, a shift lever and means for mounting said lever for movement in two angularly related planes and means whereby predetermined positions of said lever with reference to one of said planes is operative to effect a respective speed of said gear transmission, including a neutral position, detent means disposed for coaction with said lever at each of said predetermined positions and being operative to hold said lever against movement in said one plane, and permitting release of said lever on movement in the other of said planes, motion limiting means operative on movement of said lever in one direction in said other plane for restraining said lever with respect to movement in said one plane to the extent of engagement with said detent means for the next upper or lower speed only, and means for restraining said lever against motion in said other plane except at the position corresponding to neutral, said means being operative on motion of said lever in a direction opposite to said one direction.

4. In a mechanism of the class described for selecting the speed of a gear transmission, a shift lever and means for mounting said lever for movement in two angularly related planes and means whereby predetermined positions of said lever with reference to one of said planes is operative to effect a respective speed of said gear transmission, detent means disposed for coaction with said lever at each of said predetermined positions and being operative to hold said lever against movement in said one plane, and permitting release of said lever on movement in the other of said planes, motion limiting means operative on movement of said lever in said other plane for restraining said lever with respect to movement in said one plane to the extent of engagement with said detent means for the next upper or lower speed only, and resilient means for biasing said lever towards said one plane.

5. In a mechanism of the class described for selecting the speed of a gear transmission, a shift lever and means for mounting said lever for movement in two angularly related planes and means whereby predetermined positions of said lever with reference to one of said planes is operative to effect a respective speed of said gear transmission, detent means disposed for coaction with said lever at each of said predetermined positions and being operative to hold said lever against movement in said one plane, and permitting release of said lever on movement in the other of said planes, motion limiting means operative on movement of said lever in said other plane for restraining movement to a predetermined extent of said lever with respect to movement in said one plane.

6. In a mechanism of the class described for selecting the speed of a gear transmission, a shift lever and means for mounting said lever for movement in two angularly related planes and means whereby predetermined positions of said lever with reference to one of said planes is operative to effect a respective speed of said gear transmission, including a neutral position, detent means disposed for coaction with said lever at each of said predetermined positions and being operative to hold said lever against movement in said one plane, and permitting release of said lever on movement in the other of said planes, motion limiting means operative on movement of said lever in one direction in said other plane for restraining said lever with respect to movement in said one plane to the extent of engagement with said detent means for the next upper or lower speed only, means for restraining said lever against motion in said other plane except at the position corresponding to neutral, said means being operative on motion of said lever in a direction opposite to said one direction, said means comprising a shelf having a single notch therein and further comprising a spring biased pin carried by said lever and having a cam end engageable with said shelf whereby movement of said lever can effect movement of said pin below said shelf thereby preventing opposite directional movement in said other plane of said lever, except at said notch.

7. In a mechanism of the class described for selecting the speed of a gear transmission, a shift lever and means for mounting said lever for movement in two angularly related planes and means whereby predetermined positions of said lever with reference to one of said planes is operative to effect a respective speed of said gear transmission, detent means comprising an element having a row of notches therein, means whereby each of said notches is associated with a particular speed, said lever having a finger movable in said one plane for selecting a notch into which said finger may move by motion in the other of said planes, motion limiting means comprising an element having fixed teeth defining a plurality of notches and comprising a pin resiliently carried by said lever adapted to engage in said latter notches and being disposed to strike a tooth intermediate any two notches when said lever is moved in the direction of said notches so that movement of said lever in said one plane causes said pin to be resiliently biased into one of the notches of the motion limiting means to prevent further motion of said lever in said one plane.

8. In a mechanism of the class described, for selecting the speed of a gear transmission, a shift lever and means for mounting said lever for movement in two angularly related planes and means whereby predetermined positions of said lever with reference to one of said planes is operative to effect a respective speed of said gear transmission, detent means disposed for coaction with said lever at each of said predetermined positions and being operative to hold said lever against movement in said one plane, and permitting release of said lever on movement in the other of said planes, motion limiting means operative on movement of said lever in said other plane for restraining said lever with respect to movement in said one plane to the extent of engagement with said detent means for the next upper or lower speed only, said motion limiting means comprising a plate rockably carried by said lever, said plate having a finger engageable with said detent means when said lever is moved in said other plane, and means for limiting the rocking motion of said plate to the distance to be traversed by said lever for effecting selection of the next adjoining speed.

9. In a mechanism of the class described for selecting the speed of a gear transmission, a shift lever and means for mounting said lever for movement in two angularly related planes and means whereby predetermined positions of said lever with reference to one of said planes is operative to effect a respective speed of said gear transmission, detent means comprising an element having a row of notches therein, means whereby each of said notches is associated with a particular speed, said lever having a finger movable in said one plane for selecting a notch into which said finger may move by motion in the other of said planes, motion limiting means comprising a plate element having a plurality of notches, means carried by said lever for engaging any one of said notches by movement of said lever in said other plane, and a stop element coacting with said plate element to prevent movement thereof beyond a predetermined extent to thereby prevent movement of said lever in said one plane beyond a corresponding extent.

10. In a mechanism of the class described for selecting the speed of a gear transmission, a shift lever and means for mounting said lever for movement in two angularly related planes and means whereby predetermined positions of said lever with reference to one of said planes is operative to effect a respective speed of said gear transmission, detent means comprising spaced teeth disposed for coaction with said lever at each of said predetermined positions and being operative to hold said lever against movement in said one plane, and permitting release of said lever on movement in the other of said planes, motion limiting means comprising spaced teeth operative on movement of said lever in said other plane for restraining said lever with respect to movement in said one plane to the extent of engagement with said detent means for the next upper or lower speed only, said spaced teeth of said motion limiting means being carried on a plate having a pivotal mount so as to have a rocking movement relative said lever, fixed abutment means for restraining said rocking movement of said plate to a degree commensurate with the necessary degree of movement of said lever in said one plane for selecting a next succeeding speed corresponding to spacing of the teeth of said detent means, and means carried by said lever for engaging between the teeth of said motion limiting means when said lever is rocked in said other plane to limit movement of said lever in said one plane to the movement of said plate.

11. In a mechanism as set forth in claim 10, including an electro magnet having a plunger disposed to block rocking of said plate in the direction required to permit selection of a lower speed.

12. In a mechanism of the class described for selecting the speed of a gear transmission, a shift lever and means for mounting said lever for movement in two angularly related planes and means whereby predetermined positions of said lever with reference to one of said planes is operative to effect a respective speed of said gear transmission, including a neutral position, detent means disposed for coaction with said lever at each of said predetermined positions and being operative to hold said lever against movement in said one plane, and permitting release of said lever on movement in the other of said planes, motion limiting means operative on movement of said lever in one direction in said other plane for restraining said lever with respect to movement in said one plane to the extent of engagement with said detent means for the next upper or lower speed only, and means for restraining said lever against motion in said other plane except at the position corresponding to neutral, said means being operative on motion of said lever in a direction opposite to said one direction, said means comprising a shelf having a single notch therein and further comprising a spring biased pin carried by said lever and having a cam end engageable with said shelf whereby movement of said lever can effect movement of said pin below said shelf thereby preventing opposite directional movement in said other plane of said lever, except at said notch, the position of said notch corresponding to said neutral position, said detent means comprising a plate having a row of notches spaced from said shelf and comprising a finger carried by said lever engageable in said notches of said plate and movable thereout in either direction in said other plane.

13. In a mechanism of the class described for selecting the speed of a gear transmission, a shift lever and means for mounting said lever for movement in two angularly related planes and means whereby predetermined positions of said lever with reference to one of said planes is operative to effect a respective speed of said gear transmission, detent means disposed for coaction with said lever at each of said predetermined positions and being operative to hold said lever against movement in said one plane, and permitting release of said lever on movement in the other of said planes, motion limiting means operative on movement of said lever in said other plane for restraining said lever with respect to movement in said one plane to the extent of engagement with said detent means for the next upper or lower speed only, said motion limiting means comprising a plate rockably carried by said lever, and means for limiting the rocking motion of said plate to the distance to be traversed by said lever for effecting selection of the next adjoining speed, and electromagnetically operated means disposed to block movement of said plate for downspeed shift responsive to a predetermined speed of a motor associated with said mechanism.

14. In a mechanism of the class described for selecting the speed of a gear transmission, a shift lever and means for mounting said lever for movement in two angularly related planes and means whereby predetermined positions of said lever with reference to one of said planes is operative to effect a respective speed of said gear transmission, detent means disposed for coaction with said lever at each of said predetermined positions and being operative to hold said lever against movement in said one plane, and permitting release of said lever on movement in the other of said planes, motion limiting means operative on movement of said lever in one direction in said other plane for restraining said lever with respect to movement in said one plane to a predetermined extent for selection of another speed by engagement with said detent means upon reverse movement of said lever in said other plane.

15. In a mechanism as set forth in claim 14, said motion limiting means comprising an element for limiting said predetermined extent of movement of said lever in said one plane to the next upper or lower speed only.

References Cited by the Examiner
FOREIGN PATENTS
1,104,834  4/61  Germany.

DON A. WAITE, *Primary Examiner.*